March 31, 1925.  
G. G. DAVIS ET AL  
1,531,848  
BRAKE RIGGING  
Filed Jan. 24, 1923
Fig. 1.
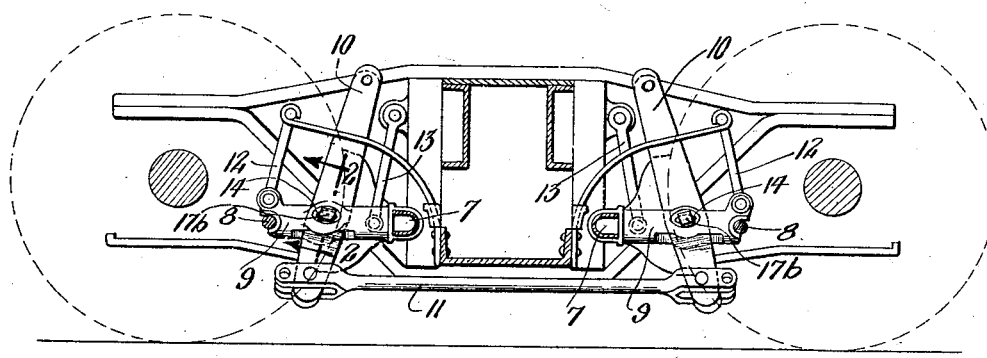
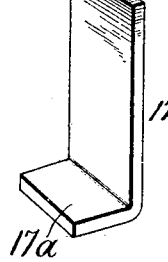
Fig. 3.
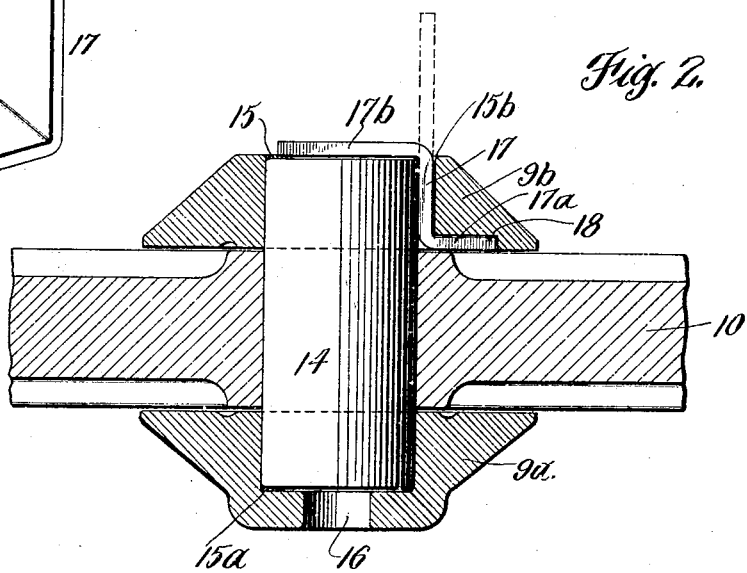
Fig. 2.
WITNESS.  
Gusto Genzlinger.
INVENTORS  
George G. Davis  
Ira S. Downing  
BY  
Symnestcott & Leemen  
ATTORNEYS Patented Mar. 31, 1925.

1,531,848

UNITED STATES PATENT OFFICE.

GEORGE G. DAVIS AND IRA S. DOWNING, OF INDIANAPOLIS, INDIANA.

BRAKE RIGGING.

Application filed January 24, 1923. Serial No. 614,512.

*To all whom it may concern:*

Be it known that we, GEORGE G. DAVIS and IRA S. DOWNING, both citizens of the United States, residing at Indianapolis, in the county of Marion and State of Indiana, have invented certain new and useful Improvements in Brake Rigging, of which the following is a specification.

This invention relates to brake rigging. Heretofore in this art, the brake lever has been fulcrumed in the brake beam strut or fulcrum by means of a headed pin or bolt secured by means of a cotter pin.

One of the primary objects of our invention is to provide an improved and simple means for fulcruming the brake lever in the strut. More specifically, our invention contemplates the use of a brake lever fulcruming pin which is headless; which requires but a little more than half as much material as the standard form of pin; and which requires neither the cotter key nor the cotter key hole heretofore employed.

The foregoing, together with such other objects as may hereinafter appear or are incident to our invention we obtain by means of a construction, the preferred embodiments of which are illustrated in the accompanying drawings, wherein:

Fig. 1 is a more or less diagrammatic section through a railway vehicle truck illustrating the application of our invention thereto; Fig. 2 is an enlarged section taken on the line 2—2 of Fig. 1; and Fig. 3 illustrates any one of a number of scrap pieces which may be utilized in securing the pin in place.

Referring now to Fig. 1, in general, a standard form of brake rigging is illustrated, such rigging comprising the beam consisting of the member 7, the tension rod 8 and the strut or fulcrum 9; the brake levers 10 and the brake lever connection 11; the brake beam hangers 12; and the brake shoe hangers 13. All of these parts may be of any one of a number of standard constructions with the exception of the strut, which, however, save with respect to the improved features to be pointed out, may also be of any typical construction.

In carrying out our invention we use a headless brake lever pin 14, preferably of a length less than the width of the strut. The strut is provided with an aperture or opening 15 to receive the pin, but the movement of the pin in the direction of its insertion is limited, to which end we prefer to have the pin-receiving aperture or opening in the lower strap $9^a$ of the strut in the form of a socket $15^a$, a small hole 16, being provided in the bottom of the socket so that the pin 14 may be driven out should it become stuck in place.

To prevent the pin 14 from working out of the socket $15^a$, a locking piece 17 is provided. This locking piece may be made out of any suitable piece of metal, scrap or otherwise, and is initially shaped as shown in Fig. 3, with a bottom leg $17^a$ which is adapted to lie in a recess 18 formed on the inner face of the upper strap $9^b$ of the strut, such leg being thus, in effect, held between the strap $9^b$ and the brake lever 10.

In assemblage the piece 17 is first inserted through the opening 15 and properly positioned, as indicated in dotted lines in Fig. 2, and then the pin 14 is dropped or forced in place, after which the upper end of the locking piece is bent over the upper end of the brake lever pin, as indicated at $17^b$ in full lines in Fig. 2. The opening 15 in the strut $9^b$ is enlarged at one side, as at $15^b$, to accommodate the central portion of the locking piece. It will be seen that the brake lever, the strut and the pin itself cooperate in positioning the inner end of the locking piece and since the straps are inclined from the vertical and there is not much play of the brake lever in the strut, there is little or no thrust on the locking piece.

What we claim is:

1. The combination in brake rigging, of a brake lever, a brake beam strut for fulcruming the lever having a socket open at one end only for insertion and removal of a brake lever pin, and a brake lever pin an end of which is adapted to be received in said socket.

2. The combination in brake rigging, of a brake lever, a brake beam strut for fulcruming the lever having a socket open at one end only for insertion and removal of a brake lever pin, and a brake lever pin an end of which is adapted to be received in said socket, together with means restraining the pin against movement out of the socket.

3. The combination in brake rigging, of a brake lever, a brake beam strut for fulcruming the lever having a socket, and a brake lever pin an end of which is adapted to be received in said socket, together with means restraining the pin against movement out of the socket, said means comprising a member between the lever and the strut and engaging the pin.

4. The combination in brake rigging, of a brake lever, a brake beam strut for fulcruming the lever having a socket, and a brake lever pin an end of which is adapted to be received in said socket, together with means restraining the pin against movement out of the socket, said means comprising a member between the lever and the strut and having an end bent over an end of the pin.

5. In brake rigging, the combination with the brake lever and its pin, of a strut having a portion constructed to receive the pin and open at one end only for insertion and removal of the pin, and means for restraining movement of the pin in the opposite direction.

6. In brake rigging, a headless brake lever pin and a strut receiving the pin and constructed to afford a socket open at one end only for insertion and removal of the pin.

7. In brake rigging, a brake lever member, a strut member, a brake lever pin member, and means preventing displacement of the pin engaged behind one of said members.

8. In brake rigging, a strut having a brake lever pin receiving aperture extending partially therethrough.

In testimony whereof, we have hereunto signed our names.

IRA S. DOWNING.
GEORGE G. DAVIS.